(12) United States Patent
Tsukamoto

(10) Patent No.: US 6,466,546 B1
(45) Date of Patent: Oct. 15, 2002

(54) COMMUNICATION APPARATUS FOR MULTIPLEXING AND COMMUNICATING A PLURALITY OF TYPES OF DATA, COMMUNICATION SYSTEM, AND CONTROL METHOD THEREFOR

(75) Inventor: Takahiro Tsukamoto, Hoya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/332,217

(22) Filed: Jun. 14, 1999

(30) Foreign Application Priority Data

Jun. 17, 1998 (JP) .......................... 10-185714
May 21, 1999 (JP) .......................... 11-141305

(51) Int. Cl.[7] .......................... G01R 31/08; H04L 12/66
(52) U.S. Cl. .......................... 370/235; 370/352
(58) Field of Search .......................... 370/229, 232, 370/235, 253, 300, 314, 352, 353, 356, 395.1, 395.63, 252

(56) References Cited

U.S. PATENT DOCUMENTS 5,878,120 A * 3/1999 O'Mahony .............. 379/93.09
6,292,484 B1 * 9/2001 Oliver .......................... 370/389

OTHER PUBLICATIONS

U.S. Patent Application Ser. No. 08/968,280 filed Nov. 12, 1997, Tsukamoto et al.

* cited by examiner

Primary Examiner—Wellington Chin
Assistant Examiner—Brenda Pham
(74) Attorney, Agent, or Firm—Morgan & Finnegan, LLP

(57) ABSTRACT

When a request to transfer real-time data is generated during transfer of non-real-time data, the transfer of the non-real-time data is interrupted, and transfer of a real-time data frame is inserted. Thereafter, the remaining non-real-time data is continuously transferred. The length of each communication frame generated by dividing the first type of data into a plurality of data and using the divided data is determined depending on whether the second type of data is communicated.

4 Claims, 15 Drawing Sheets

FIG. 6

| PREAMBLE | SFD | DESTINATION ADDRESS | SOURCE ADDRESS | FRAME LENGTH | LOGIC LINK CONTROL HEADER /DATA | FCS |

SFD : START FRAME DELIMITER
FCS : FRAME CHECK SEQUENCE

FIG. 7

| F | A | C | VDB(VOICE DATA BLOCK) | FCS | F |

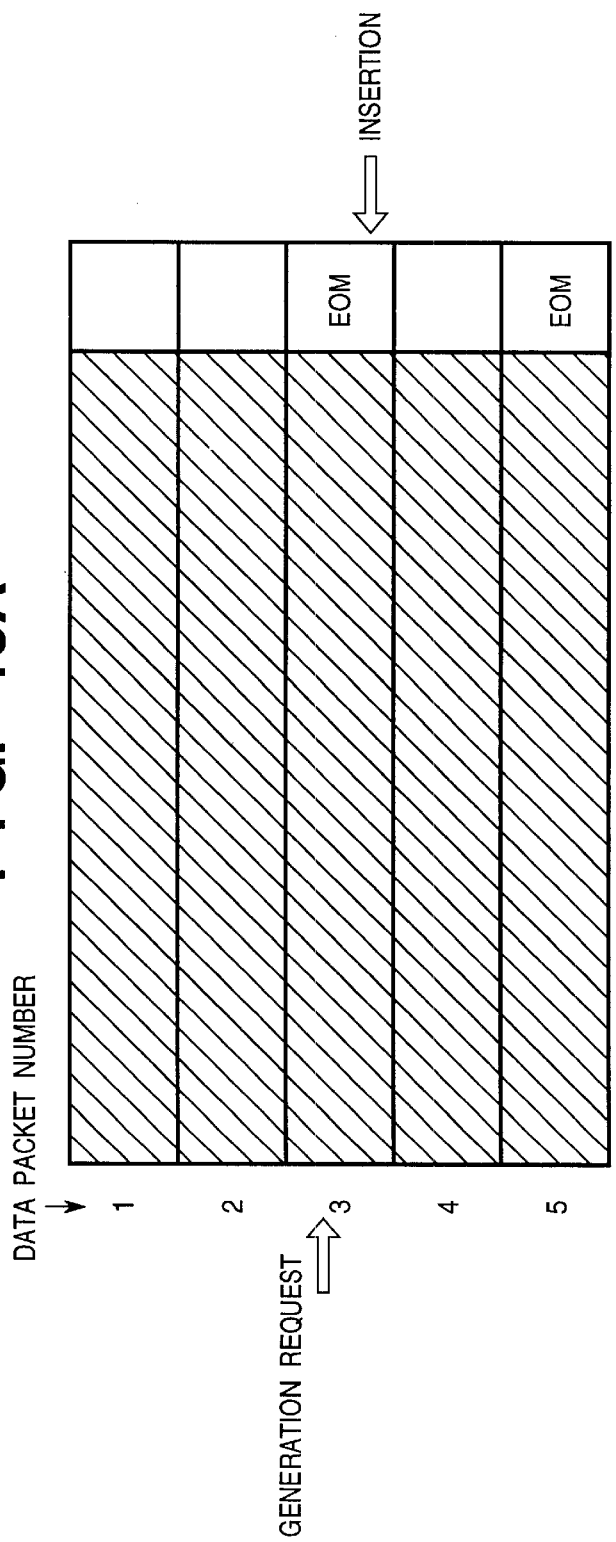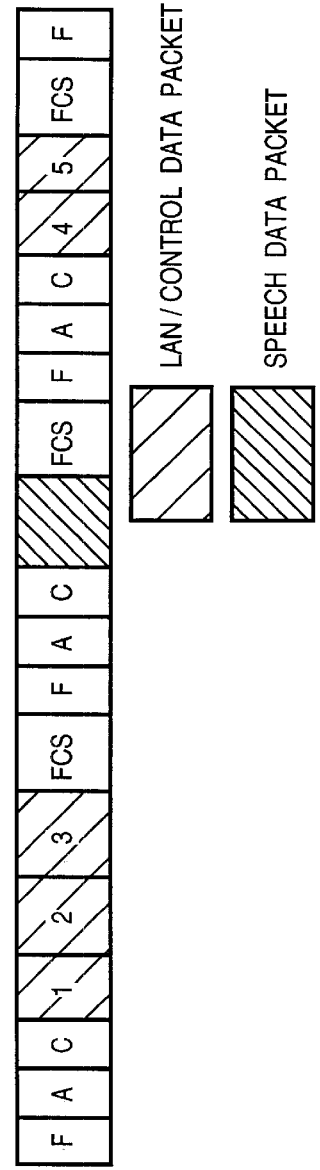
FIG. 13A
FIG. 13B

FIG. 15

| TRANSFER RATE | DATA PACKET BUFFER LENGTH AND MAXIMUM PACKET READ POINTER VALUE |
|---|---|
| 64kbps | N BYTES |
| 256kbps | 4 × N BYTES |
| 512kbps | 8 × N BYTES |
| 768kbps | 12 × N BYTES |

TRANSFER RATE CONTROL TABLE

COMMUNICATION APPARATUS FOR MULTIPLEXING AND COMMUNICATING A PLURALITY OF TYPES OF DATA, COMMUNICATION SYSTEM, AND CONTROL METHOD THEREFOR

BACKGROUND OF THE INVENTION

1. Field of the Invention

The present invention relates to a communication apparatus for efficiently multiplexing and communicating a plurality of types of data such as real-time data such as speech data for which real-time transmission is required and non-real-time data such as LAN data for which a certain delay is allowed, a communication system, and a control method for the apparatus and system.

2. Description of the Related Art

A multimedia communication system capable of communicating various types of data generally uses a means for transmitting real-time data such as multiplexed data of speech data and the like in a PBX (private branch exchange) and a non-real-time data in a LAN or the like, for which a certain delay is allowed, by time division multiplexing (TDM) or the like. Recently, a means for transmitting data upon dynamically allocating a band by using a statistical multiplexing effect is available.

According to this means using the statistical multiplexing effect, non-real-time data is divided into blocks each having a fixed frame length, and each fixed-length block is formed as a frame to be transmitted. When a request to transmit real-time data is generated while the non-real-time data frames are transmitted, the real-time data is inserted between the fixed-length block frames.

This system may use a simple method in which when real-time data is generated while variable-length transfer information requested as non-real-time data is transmitted, transmission of the real-time data is started immediately after transmission of the non-real-time data, which is currently transmitted, is complete.

When, however, the above TDM scheme is used, it is difficult to effectively use a band, because the band is ensured even while no data is transmitted.

In the scheme of dynamically allocating a band, while fixed-length blocks are transferred, real-time-data is inserted between the fixed-length blocks. Frame control codes and the like are inserted in units of fixed-length blocks, resulting in an increase in overhead. This makes it difficult to effectively use the band.

In contrast to this, if the fixed length of each block is increased for effective use of a band, the start of the transfer of real-time data from this transfer state is delayed, resulting in an increase in delay in data transfer.

In addition, in the simple method in which when real-time data is generated while variable-length transfer information requested as non-real-time data is transmitted, the transmission of the real-time data is started immediately after the transmission of the non-real-time data is complete, the start of the transfer of the real-time data from this transfer state is delayed depending on the data length of the non-real-time data. As a consequence, data transfer may be greatly delayed.

SUMMARY OF THE INVENTION

It is an object of the present invention to effectively use bands.

It is another object of the present invention to efficiently communicate non-real-time data and real-time data.

It is still another object of the present invention to communicate real-time data without degrading the real-time property even during communication of non-real-time data.

According to the present invention, the foregoing object is attained by a communication apparatus for transferring, to a communication network, a frame formed by multiplexing real-time data for which real-time transmission is required and non-real-time data for which a certain delay is allowed, upon dynamically allocating a band by using a statistical multiplexing effect, comprising detection means for detecting generation of the real-time data, disassembly means for disassembling the non-real-time data into at least one fixed-length data packet, frame generating means for generating the frame from the disassembled data packet or the real-time data, insertion means for, when generation of the real-time data is detected by said detection means while the frame is generated by using the disassembled data packet, interrupting the generation of the frame using the disassembled data packet, and inserting generation of the frame using the real-time data, and resuming means for, after the insertion is performed by said insertion means, resuming the generation of the frame using the disassembled data packet before the insertion.

In accordance with the present invention as described above, when a request to transfer real-time data is generated while non-real-time data is transferred, the non-real-time data is transferred in units of frames each having a predetermined data length, and the real-time data frame is inserted between the non-real-time data frames. Thereafter, the remaining data packets are continuously transferred, thereby effectively using a band.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6 is a view showing the format of an IEEE802.3 frame for a LAN;

FIG. 7 is a view showing the format of a speech data frame;

FIGS. 13A and 13B are views respectively showing the arrangement of the data packet buffer unit 73 and an example of frame data output from the frame assembly unit 78;

FIG. 15 is a view showing a transfer rate control table.

DETAILED DESCRIPTION OF THE PREFERRED EMBODIMENT

An embodiment of the present invention will be described below with reference to the accompanying drawings.

Figure 1:
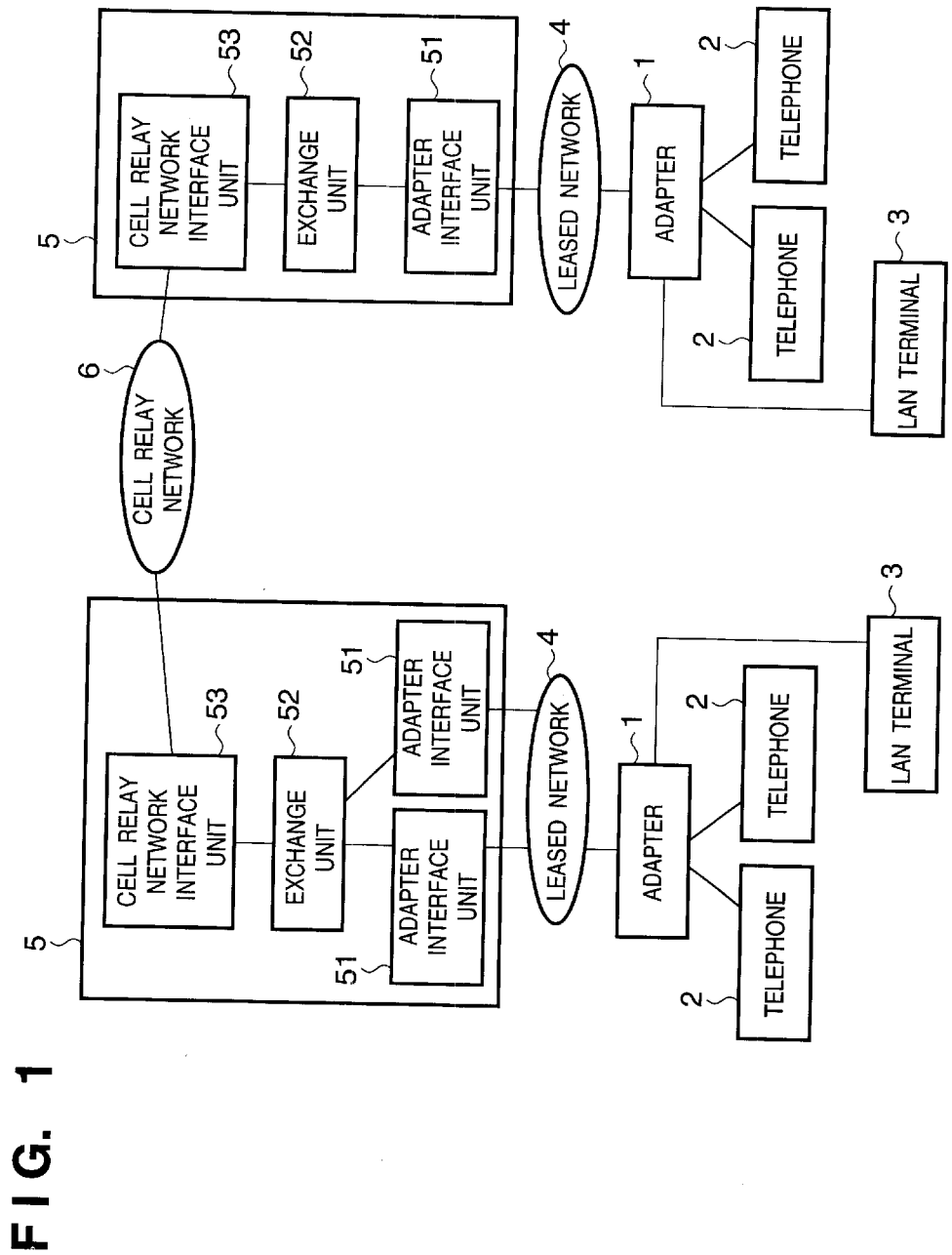
FIG. 1 is a block diagram showing the schematic arrangement of a multimedia communication system according to an embodiment of the present invention.

FIG. 1 shows the schematic arrangement of a multimedia communication system according to an embodiment of the present invention.

The multimedia communication system according to the embodiment of the present invention is a system for transmitting speech data from a telephone for which real-time transmission is required and non-real-time LAN data for which a certain delay is allowed.

This multimedia communication system includes adapters 1 for connecting a plurality of telephones 2 for generating speech data for which real-time transmission is required and also connecting a LAN terminal 3 for generating non-real-time LAN data, and node units 5 for exchanging various data including speech data and LAN data obtained from the respective adapters 1 in accordance with the destinations.

Each adapter 1 is connected to the corresponding node unit 5 through a leased network 4 as a general service. The respective node units 5 are connected through a cell relay network 6. The cell relay network 6 transfers ATM (Asynchronous Transfer Mode) cells by using leased line secondary group rate frames defined by JT-G703-a of the TTC standards.

Each adapter 1 multiplexes speech data from each connected telephone 2 and LAN data from the LAN terminal 3 in a band dynamically allocated by using the statistical multiplexing effect, and sends the resultant data to the corresponding node unit 5 through the leased network 4.

To receive data from the adapter 1 and transmit data to the adapter 1 through the leased network 4, the node unit 5 is comprised of an adapter interface unit 51 for assembling/disassembling the data frames, an exchange unit 52 for exchanging the assembled/disassembled data frames in accordance with the destinations, and a cell relay network interface unit 53 for multiplexing the data frames to send them to the other node unit 5 through the cell relay network 6.

The adapter interface unit 51 is connected to the cell relay network interface unit 53 through the exchange unit 52.

Figure 2:
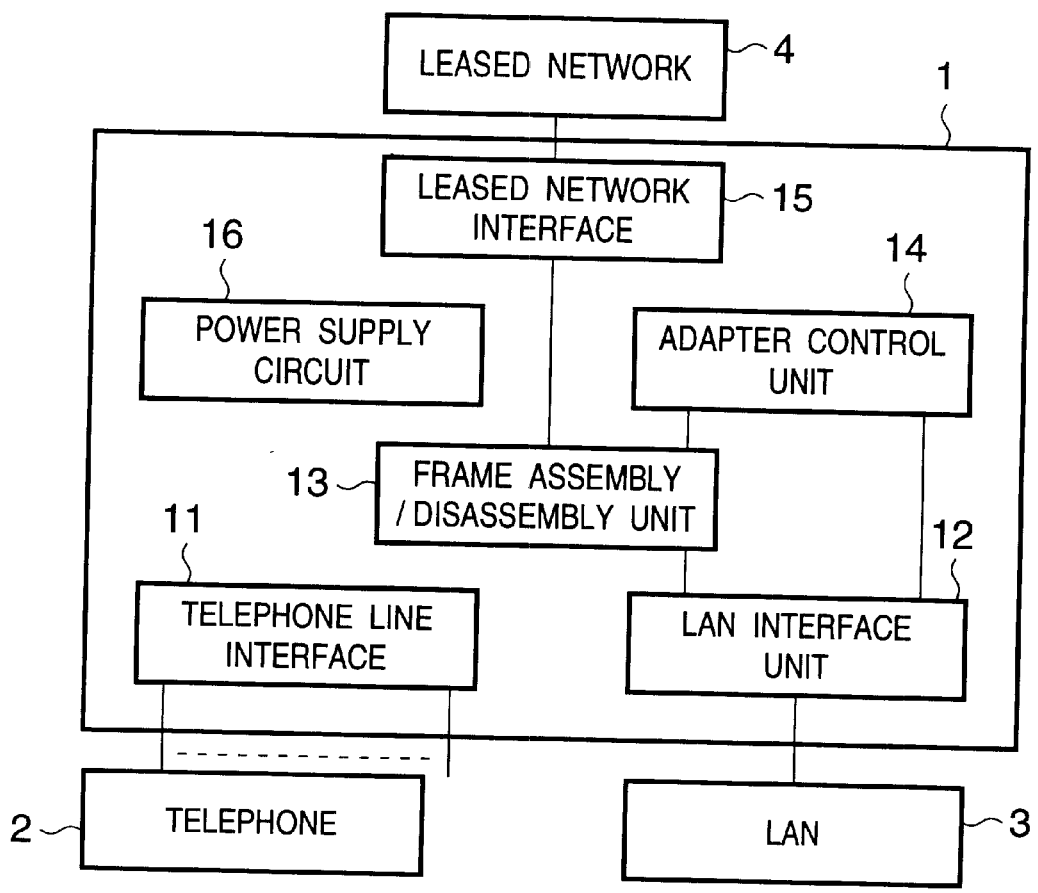
FIG. 2 is a block diagram showing the detailed arrangement of an adapter 1.

FIG. 2 shows the detailed arrangement of the adapter 1.

The adapter 1 includes a telephone line interface 11 to which a plurality of telephones 2 are connected, and a LAN interface unit 12 to which the LAN terminal 3 is connected. The adapter 1 also includes a leased network interface 15 to which the leased network 4 is connected, a frame assembly/disassembly unit 13 connected to the telephone line interface 11, the LAN interface unit 12, and the leased network interface 15, a power supply circuit 16 for supplying power to each component of the adapter 1, and an adapter control unit 14 for controlling each component of the adapter 1.

The telephone line interface 11 includes a step-up unit for generating a voltage required to generate a call signal for the telephone 2, a ringer (call signal) generating unit, a DTMF (Dual Tone MultiFrequency) decoder unit, and a circuit (not shown) such as a hook determination unit which controls an interface with each telephone line. This circuit includes a CODEC (coder/decoder) circuit for inputting/outputting speech data from/to each telephone 2 and compressed/coded data of the speech data, generating compressed/coded data by compressing/coding the input speech signal, and generating a speech signal by decoding the input compressed/coded data. This circuit sends the decoded speech signal to the corresponding telephone 2. In compressing/coding operation, unvoiced control is performed such that compressed/coded data of speech is generated but is not output during an unvoiced period.

The LAN interface unit 12 inputs/outputs LAN data, detects an IEEE802.3 frame from the input LAN data, and checks a MAC address and the like in this frame, thereby transmitting or discarding the data in accordance with this check result (bridge function).

The compressed/coded data from the telephone line interface 11 and the LAN data from the LAN interface unit 12 are sent to the frame assembly/disassembly unit 13.

The frame assembly/disassembly unit 13 multiplexes the input compressed/coded data and LAN data with control data from the adapter 1 in a dynamically allocated band, thereby forming a frame that can be sent to the leased network 4. The frame assembly/disassembly unit 13 then outputs the frame to the leased network interface 15. In addition, upon reception of a frame from the leased network interface 15, the frame assembly/disassembly unit 13 disassembles the frame into compressed/coded data and LAN data/control data, outputs the compressed/coded data to the telephone line interface 11, and also outputs the LAN data/control data to the LAN interface unit 12 and the adapter control unit 14.

The adapter control unit 14 has a CPU (not shown) and a ROM (not shown). The CPU reads out programs from the ROM and executes them to control the overall adapter 1. This control includes transmission/reception control on frames between the frame assembly/disassembly unit 13 and the leased network interface 15, management of the telephone line interface 11, control on the LAN interface unit 12 and the frame assembly/disassembly unit 13, and control on the power supply voltage from the power supply circuit 16 to each component.

The leased network interface 15 functions as terminal adapter and is connected to the leased network 4 through a DSU (Digital Service Unit) provided on the leased network 4 side.

Figure 3:
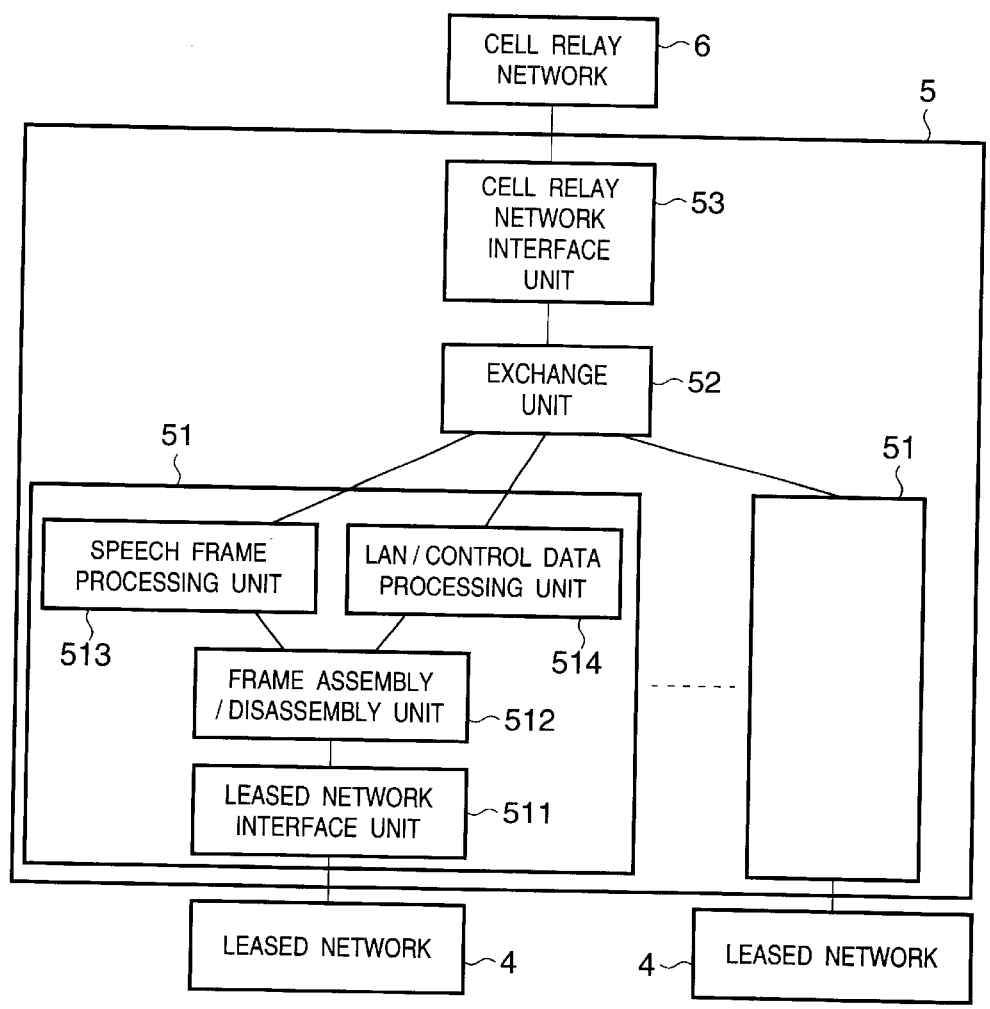
FIG. 3 is a block diagram showing the detailed arrangement of a node unit 5 described with reference to FIG. 1.

FIG. 3 shows the more detailed arrangement of the node unit 5 described with reference to FIG. 1.

To receive data from the adapter 1 and transmit data to the adapter 1, the node unit 5 includes the adapter interface unit 51 for assembling/disassembling data frames, the exchange unit 52 for exchanging the assembled/disassembled data frames in accordance with the destinations, and the cell relay network interface unit 53 for multiplexing data frames to send them to the other node unit 5 through the cell relay network 6.

The adapter interface unit 51 is connected to the cell relay network interface unit 53 through the exchange unit 52.

The adapter interface unit 51 includes a leased network interface unit 511 for performing frame detection by performing synchronization and the like of a frame input from the leased network 4, a frame assembly/disassembly unit 512 for disassembling the frame into a speech data frame and a LAN data frame, a speech frame processing unit 513 for generating and processing an exchange frame for speech data, and a LAN/control data processing unit 514 for generating and exchange frame for LAN data. The exchange frames generated by the speech frame processing unit 513 and the LAN/control data processing unit 514 are sent to the exchange unit 52.

Upon reception of an exchange frame from the exchange unit 52, the adapter interface unit 51 extracts data from the exchange frame to make the speech frame processing unit 513 or the LAN/control data processing unit 514 process the data, and also makes the frame assembly/disassembly unit 512 assemble a data frame including speech data or LAN data so as to transmit the assembled frames to the leased network 4 in order to multiplex the frames by statistical multiplexing. The adapter interface unit 51 then outputs the data frame to the leased network 4 through the leased network interface unit 511.

The exchange unit 52 sends the exchange frame to the cell relay network interface unit 53 in accordance with the destination information in the exchange frame in order to send the frame to the other adapter interface unit 51 in the same node unit 5 or the other node unit 5.

The cell relay network interface unit 53 generates an exchange frame containing speech data or LAN data from the cell received from the cell relay network 6, and outputs the exchange frame to the exchange unit 52 to send it to each adapter interface unit 51. In addition, the cell relay network interface unit 53 converts the exchange frame received from the exchange unit 52 into a cell so as to transmit the exchange frame to the cell relay network 6, and transmits it.

Figure 4:
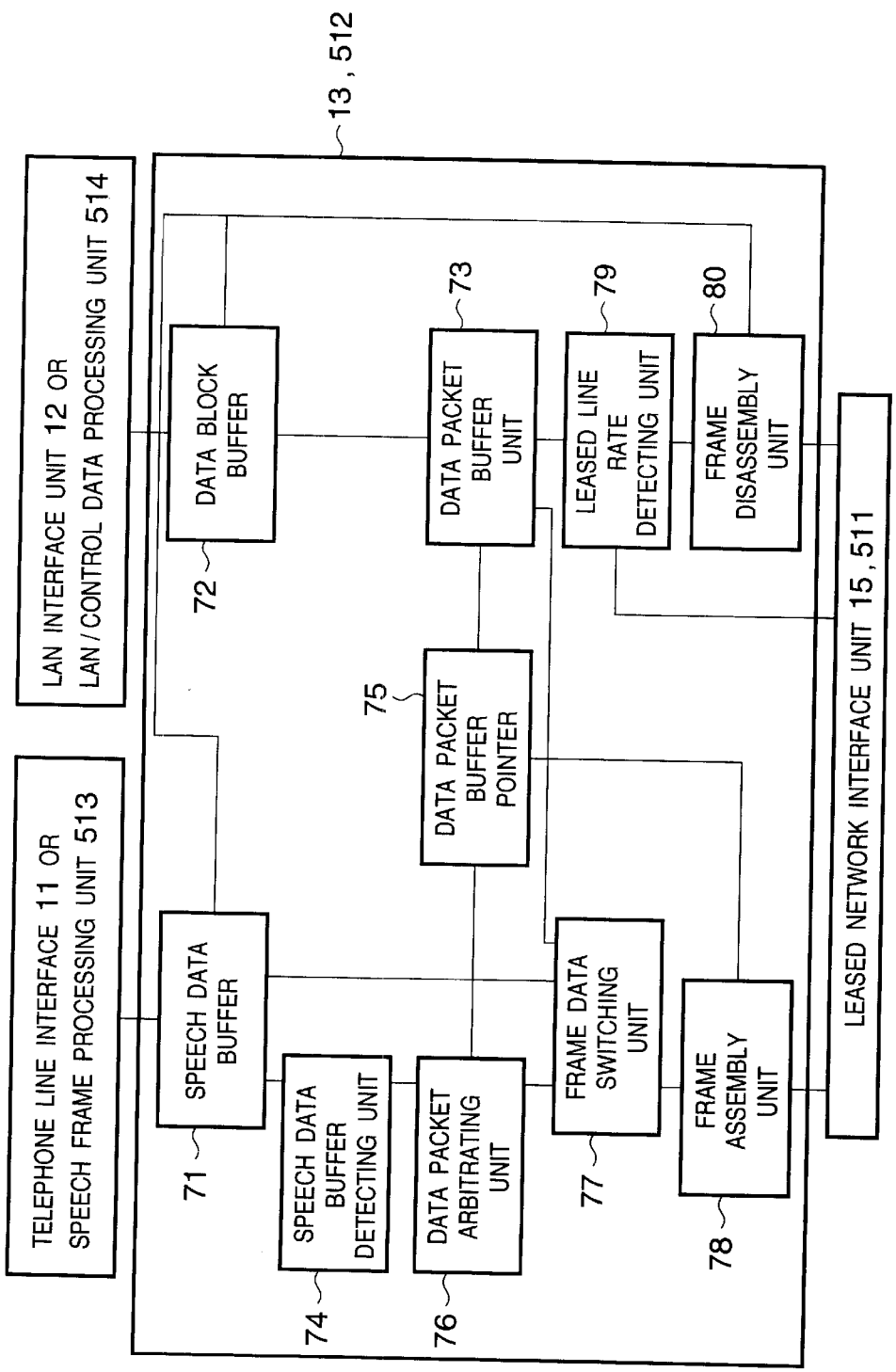
FIG. 4 is a block diagram showing the detailed arrangement of a frame assembly/disassembly unit 13 in FIG. 2 and frame assembly/disassembly unit 512 in FIG. 3.

Since the frame assembly/disassembly unit 13 in FIG. 2 has the same function/arrangement as that of the frame assembly/disassembly unit 512 in FIG. 3, these units will be simultaneously described with reference to FIG. 4 showing the more detailed arrangement of each of the frame assembly/disassembly unit 13 in FIG. 2 and the frame assembly/disassembly unit 512 in FIG. 3.

In the following description, each reference numeral without "[]" indicates the frame assembly/disassembly unit 13 itself or its component, whereas each reference numeral with "[]" indicates the frame assembly/disassembly unit 512 itself or its component.

The frame assembly/disassembly unit 13 dynamically allocates a band to real-time data from the telephone line interface 11 and non-real-time data form the LAN interface unit 12 to statistically multiplex the two types of data into a frame, and sends the frame to the leased network interface 15. In contrast to this, the frame assembly/disassembly unit 13 disassembles the frame received from the leased network interface 15 into real-time data and non-real-time data. The frame assembly/disassembly unit 13 then outputs the real-time and non-real-time data to the telephone line interface 11 and the LAN interface unit 12, respectively.

The frame assembly/disassembly unit 512 dynamically allocates a band to real-time data from the speech frame processing unit 513 and non-real-time data from the LAN/control data processing unit 514 to statistically multiplex the two types of data into a frame, and sends the frame to the leased network interface 511. In contrast to this, the frame assembly/disassembly unit 512 disassembles the frame received from the leased network interface 511 into real-time data and non-real-time data, and outputs the real-time and non-real-time data to the speech frame processing unit 513 and the LAN/control data processing unit 514, respectively.

The frame assembly/disassembly unit 13 [512] includes a speech data buffer 71 for storing the real-time data received from the telephone line interface 11 [speech frame processing unit 513], and a data block buffer 72 for storing the non-real-time data received from the LAN interface unit 12 [LAN/control data processing unit 514]. The data block buffer 72 is a transmission/reception buffer for data such as an IEEE802.3 frame in a LAN or the like or control data frame, and disassembles the data into fixed-length data packets. Note that the packet length in data packet disassembly is determined in accordance with a command from the leased line rate detecting unit 79, and will be described later.

The frame assembly/disassembly unit 13 [512] further includes a data packet buffer unit 73 for storing fixed-length data packets disassembled by the data block buffer 72, a speech data buffer detecting unit 74 for detecting that data that needs to be sent as a frame to the leased network interface 15 [511] is stored in the speech data buffer 71, a data packet buffer pointer 75 for setting the data packet number of the packet of the plurality of disassembled data packets stored in the data packet buffer unit 73 which is being set as the current frame, and also setting an end flag for the last disassembled data packet stored in the data packet buffer unit 73, and a data packet arbitrating unit 76 for performing arbitration when both the speech data buffer 71 and the data packet buffer unit 73 simultaneously request frame assembly.

Assume that while the frame assembled from the data in the speech data buffer 71 is transferred, the data stored in the data block buffer 72 is disassembled into fixed-length data packets and stored in the data packet buffer unit 73. In this case, the data packet arbitrating unit 76 starts transferring the data packets from the data packet buffer unit 73 after the frame from the speech data buffer 71 is completely transferred. In contrast to this, assume that while the frame assembled from the fixed-length data packets in the data packet buffer unit 73 is transferred, the speech data buffer detecting unit 74 detects that data is stored in the speech data buffer 71. In this case, this information is reported to the data packet arbitrating unit 76, and the data packet arbitrating unit 76 starts arbitration. The detailed contents of this operation will be described later.

The frame assembly/disassembly unit 13 [512] also includes a frame data switching unit 77 for switching data storage in the data area of a frame between the data in the speech data buffer 71 and the data in the data packet buffer unit 73, a frame assembly unit 78 for generating an HDLC (High-level Data Link Control) frame (to be described later), a leased line rate detecting unit 79 for adjusting the data length in the data packet buffer unit 73 in accordance with rate information from the leased network interface 15 [511], and a frame disassembly unit 80 for disassembling the HDLC frame received from the leased network interface 15 [511], identifying real-time data and non-real-time data, transferring the real-time data to the speech data buffer 71 for transmitting the data to the telephone line interface 11 [speech frame processing unit 513], and transferring the non-real-time data to the data block buffer 72 for sending the data to the LAN interface unit 12 [LAN/control data processing unit 514].

Figure 5:
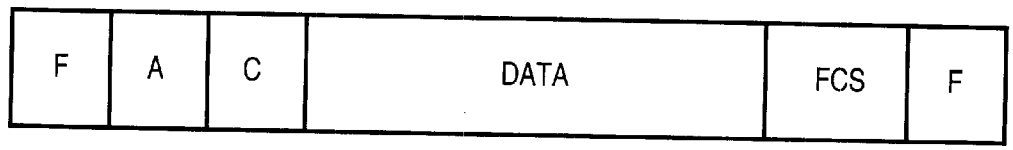
FIG. 5 is a view showing the format of an HDLC (High-level Data Link Control) frame.

FIG. 5 shows the format of an HDLC (High-level Data Link Control) frame.

Referring to FIG. 5, "F" represents a flag having the pattern "01111110"; "A", an address area used to designate an addressee; and "C", an area for control information for sending control data.

Referring to FIG. 5, "DATA" represents a data area that can be freely used by the user. Data is transparently transferred. In "DATA", zero insertion/removal (when, for example, five or more "1"s continue, "0" is inserted after the fifth "1", and "0" is removed after five consecutive "1"s on the receiving side) processing is performed to prevent a pattern identical to the flag in "F" from appearing.

Referring to FIG. 5, "FCS" represents a frame check sequence which is a 2-byte redundant data for checking the presence/absence of an error in the data area.

This HDLC frame is the transfer format used to transfer data between the adapter 1 and the node unit 5 through the leased network 4. The bit pattern obtained by compressing/coding speech, LAN data, or control data between the adapter 1 and the node unit 5 is set in "DATA" as a data area and sent.

FIG. 6 shows the format of an IEEE802.3 frame for a LAN.

The IEEE802.3 frame for a LAN includes a preamble, an SFD (Start Frame Delimiter), a destination address, and a source address. These addresses are MAC addresses defined by the MAC sub-layer of the data link layer. The IEEE802.3 frame for a LAN further includes a frame length indicating the data length, logic link control header/data, and an FCS (Frame Check Sequence) for checking the frame.

Figure 7:
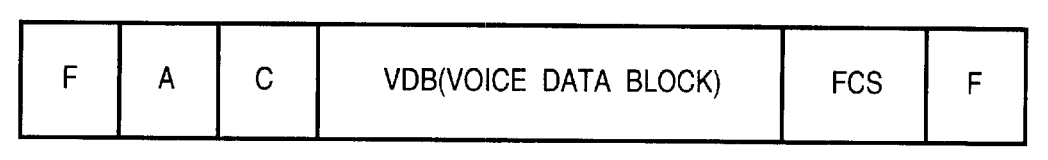
Figure 8:
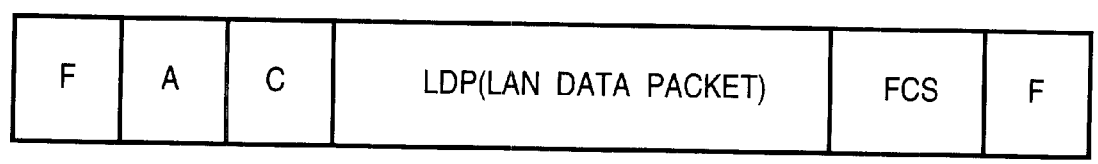
FIG. 8 is a view showing the format of a LAN data frame.

FIG. 7 shows the format of a speech data frame. FIG. 8 shows the format of a LAN data frame. Referring to FIG. 7, "VDB" (Voice Data Block) represents the data obtained by compressing/coding speech. Referring to FIG. 8, an LDP (LAN Data Packet) is formed by the IEEE802.3 frame shown in FIG. 6.

The flow of data in the interval between the instant at which the data block buffer 72 in FIG. 4 receives LAN data and the instant at which a frame is generated by the frame assembly unit 78 through the data packet buffer unit 73 and the frame data switching unit 77 will be described next.

Figure 9:
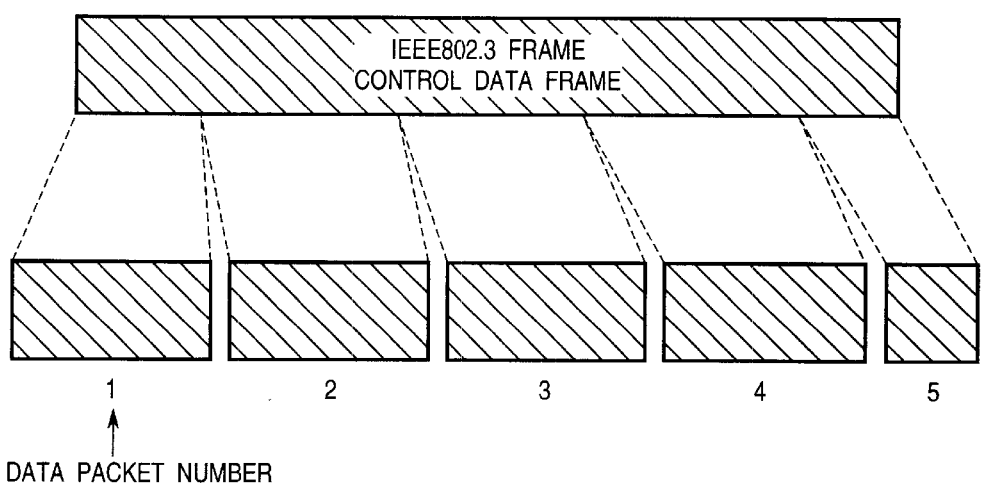
FIG. 9 is a view showing an example of how LAN data is divided into packets each having a predetermined fixed data length.

The data block buffer 72 receives LAN data formed by an IEEE802.3 frame or control data frame, and divides the data into packets each having a predetermined fixed data length, as shown in FIG. 9. This fixed data length is adjusted by the leased line rate detecting unit 79.

Figure 10:
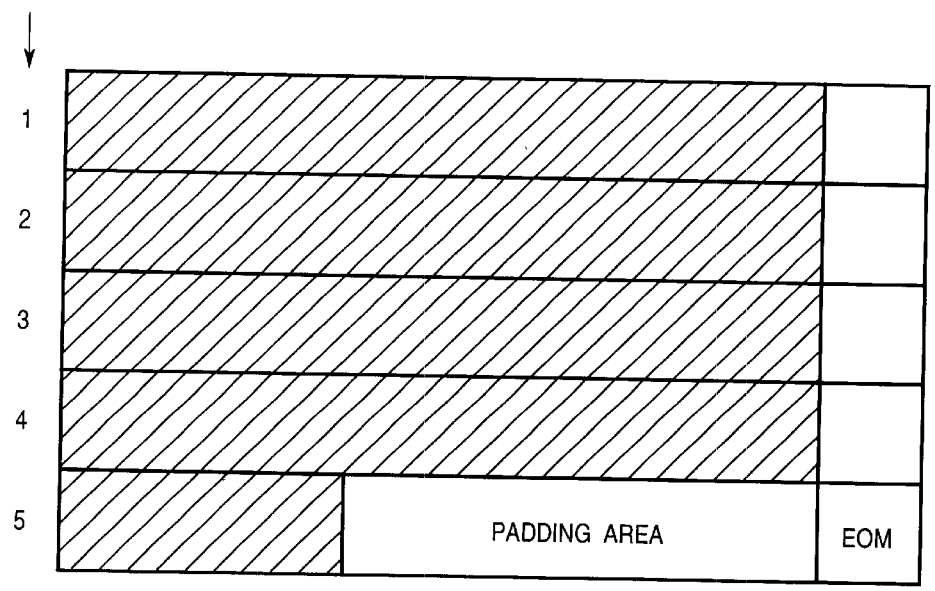
FIG. 10 is a view showing the detailed arrangement of a data packet buffer unit 73.

Subsequently, the data packet buffer unit 73 stores the packets divided as shown in FIG. 10. In this case, a remaining area may be produced in the last data packet because this packet is formed by the remaining data after division. This area will be referred to as a padding area. In the case shown in FIG. 10, since the LAN data is divided into five data packets, a padding area is produced in the area of the data packet number "5".

In addition, the data packet buffer unit 73 has, in the last area of each data packet buffer, an area for setting an "EOM" (End Of Message) control flag for allowing the data packet buffer pointer 75 to recognize the end of a series of data packets.

Figure 11:
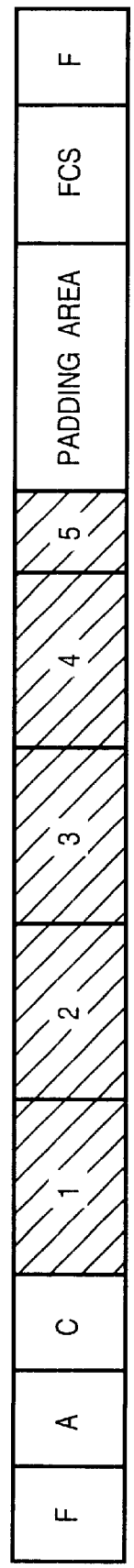
FIG. 11 is a view showing an example of the format of a frame in a frame assembly unit 78.

Upon detection of the EOM flag, the data packet buffer pointer 75 sends the corresponding information to the frame assembly unit 78. As a consequence, the frame assembly unit 78 recognizes the data with the data packet number "5" as the last data, and adds the value of "FCS" described with reference to FIG. 5 to the frame, thereby terminating the frame. FIG. 11 shows the format of this frame.

With regard to speech, when the speech CODEC generates compressed/coded data at certain time intervals, these data are sent as one block in an HDLC frame.

In this case, when the speech data is stored in the speech data buffer 71, and the storage of the data in the buffer is detected by the speech data buffer detecting unit 74, this information is sent to the data packet arbitrating unit 76. As a consequence, arbitration for frame transmission control is started. At this time, if no data from which a frame is to be formed is stored in the data packet buffer unit 73, the data packet arbitrating unit 76 immediately switches the frame data switching unit 77 to allow the data in the speech data buffer 71 to be transferred to the frame assembly unit 78. Thereafter, the frame assembly unit 78 starts assembling a frame.

A case in which data from which a frame is to be formed is stored in the data packet buffer unit 73, and the frame data switching unit 77 transfers the data in the data packet buffer unit 73 to the frame assembly unit 78 will be described next.

Figure 12:
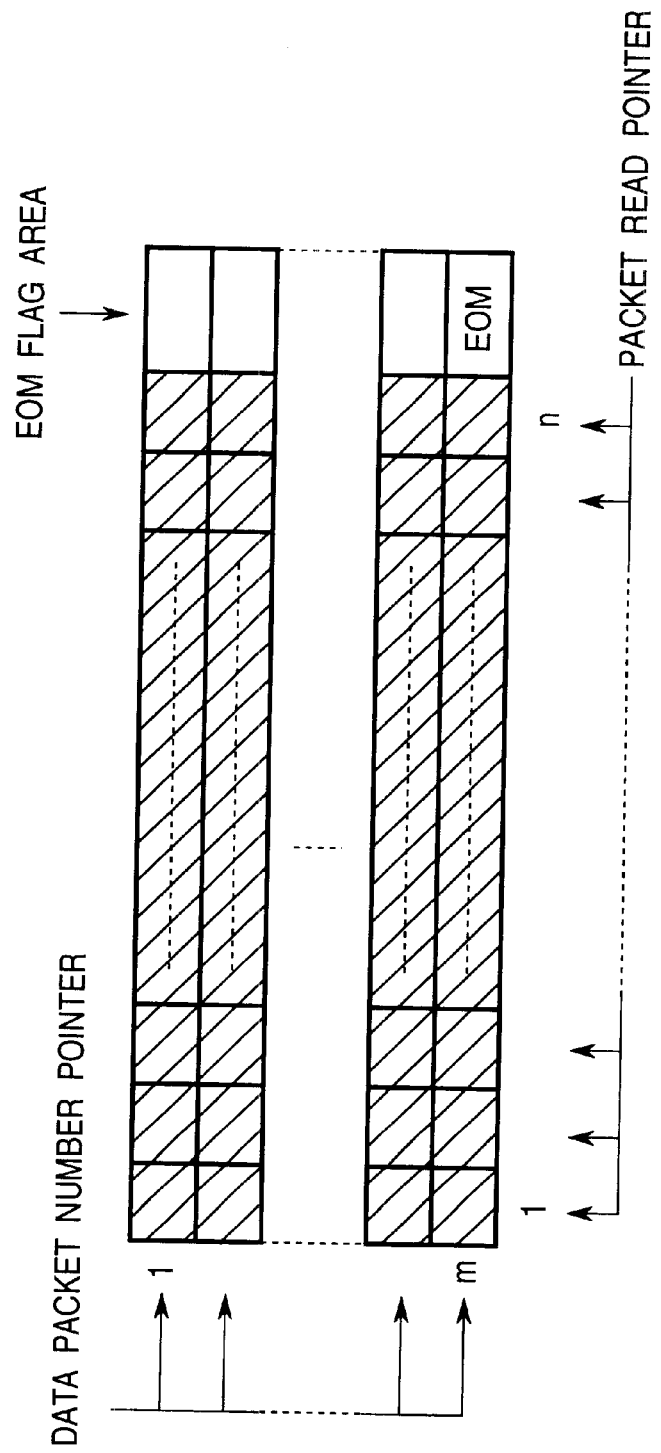
FIG. 12 is a view showing the detailed arrangement of the data packet buffer unit 73.

FIG. 12 shows the format of the data packet buffer unit 73.

The data packet buffer unit 73 stores data packets each having a data length of, e.g., n bytes. The number of data packets is indicated by a data packet number pointer (m packets at maximum), and the number of bytes is indicated by a packet read pointer.

When data is transferred from the data packet buffer unit 73 to the frame assembly unit 78 through the frame data switching unit 77, the data packet buffer pointer 75 sequentially monitors which byte in a specific packet is being read out in accordance with the data packet number pointer and the packet read pointer therein. When, therefore, the packet read pointer indicates that the nth byte is read out, the data packet buffer pointer 75 detects the EOM flag. When the packet read pointer indicates that one of the first to (n−1)th bytes is being read out, no EOM flag is detected.

That is, upon reception of speech data packet detection information from the data packet arbitrating unit 76 until the (n−1)th byte data is read out, the data packet buffer pointer 75 inserts the EOM flag in the EOM flag area of the packet portion of the data packet pointer indicating the currently readout packet, and outputs a command to start frame end processing to the frame assembly unit 78. When speech data packet detection information is notified while n-byte data is read, the EOM flag is inserted in the EOM flag area of the next data packet number pointer of the currently readout data packet number pointer to command the frame assembly unit 78 to start frame end processing.

Subsequently, the data packet arbitrating unit 76 checks the frame end processing performed by the data packet buffer unit 73 and switches the frame data switching unit 77 to transmit the data in the speech data buffer 71 as a frame. After transferring the data in the speech data buffer 71, the data packet arbitrating unit 76 designates frame end processing. In addition, the data packet arbitrating unit 76 outputs a frame start command to the frame assembly unit 78 to generate data as a frame from the data packet number indicating the packet next to that packet in the data packet buffer unit 73 in which the EOM flag is inserted, and switches the frame data switching unit 77. Thereafter, the data packet arbitrating unit 76 outputs a read command to the data packet buffer pointer 75 to start generating a frame of the remaining data in the data packet buffer unit 73.

When a transfer request for real-time data is generated during transfer of non-real-time data in this manner, the non-real-time data is transferred in units of frames each having the data length in the data packet buffer unit 73, and a real-time data frame is inserted between non-real-time data frames. Thereafter, the remaining data packets in the data packet buffer unit 73 are continuously transferred.

FIGS. 13A and 13B respectively show the format of the data packet buffer unit 73 and the frame data output from the frame assembly unit 78 in a case in which the speech data buffer detecting unit 74 detects that speech data is stored in the speech data buffer 71 while the packet read pointer corresponding to the data packet number "3" in the data packet buffer unit 73 indicates that the first to (n−1)th bytes are being read.

Figure 14:
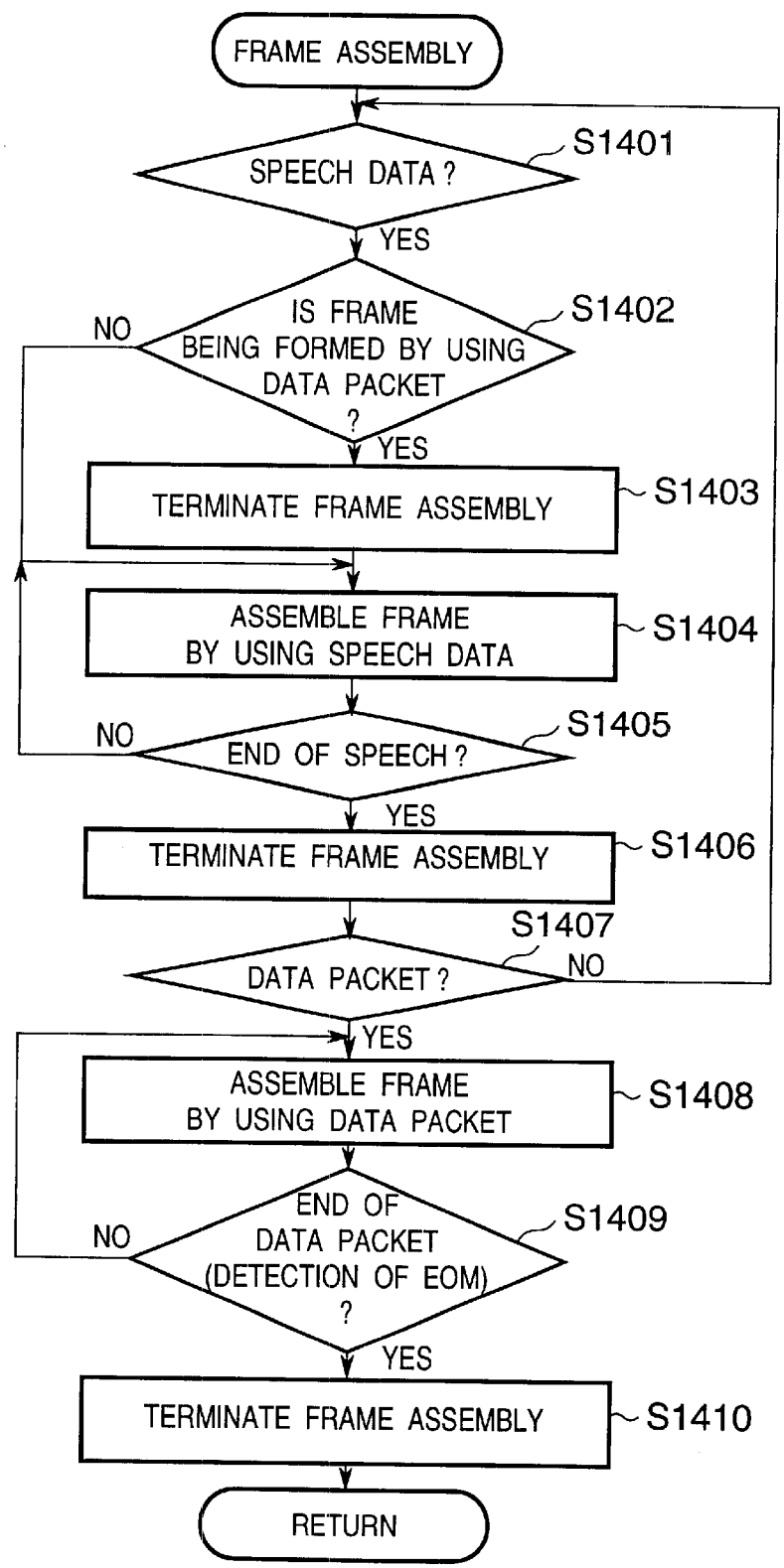
FIG. 14 is a flow chart for briefly explaining control between the adapter 1 and the node unit 5.

FIG. 14 is a flow chart for briefly explaining control on the adapter 1 and the node unit 5 when an HDLC frame is to be transferred between the adapter 1 and the node unit 5 through the leased network 4.

Referring to FIG. 14, the frame assembly unit 78 checks on the basis of a signal from the speech data buffer detecting unit 74 whether speech data is stored in the speech data buffer 71 (step S1401). If it is determined in step S1401 that speech data is stored in the speech data buffer 71, it is checked whether the data packets stored in the data packet buffer unit 73 are being assembled into a frame (step S1402). If it is determined that a frame is being assembled, the assembly of the data packets is completed (step S1403). If it is determined in step S1402 that no frame is being assembled, or it is determined in step S1403 that the assembly of a frame is completed, the speech data is stored in the DATA area of the HDLC frame to assemble a frame (step S1404).

If no speech data is left in the speech data buffer 71 (step S1405), the frame assembly is terminated (step S1406). It is then checked whether any data packet is stored in the data packet buffer unit 73 (step S1407). If it is determined that a data packet is stored, the data is stored in the DATA area of the HDLC frame to assemble a frame (step S1408). If no data packet is left in the data packet buffer unit 73 or an EOM is detected by the data packet -buffer pointer 75 after speech data is stored in the speech data buffer 71 (step S1409), the frame assembly is terminated (step S1410). The flow then returns to step S1401.

The leased line rated detecting unit 79 shown in FIG. 4 and the transfer rate control table shown in FIG. 15 will be described next.

As has been described above, when compressed/coded data is generated in the speech data buffer 71, the data packet stored in the data packet buffer 73 waits during a transfer time of a maximum of one data packet until insertion of transfer of the data from the speech data buffer 71. As a consequence, when the adapters 1 based on the same control operation are used on the reception and transmission sides, the response time to real-time data differs depending on the transfer rate. With a delay exceeding a predetermined period of time, a failure such as an echo occurs in real-time data such as speech data. For this reason, control is required to keep the delay time constant regardless of the transfer rate. The data packet buffer unit 73 and data packet buffer pointer 75 in the frame assembly/disassembly unit 13 [512] therefore perform control to eliminate variations in delay time due to different transfer rates and keep the delay time constant by detecting the data transfer rate in the leased network 4 using the leased line rate detecting unit 79 for the leased network interface 15 of the adapter 1 or the leased network interface unit 511 of the node unit 5. In the data packet buffer unit 73 and the data packet buffer pointer 75, the respective transfer rates shown in FIG. 15 are set on the basis of information from the leased line rate detecting unit 79 in FIG. 4.

If, for example, the transfer rate of the leased network 4 is detected as 64 kbps, data from the data block buffer 72 is divided into data packets each having a fixed length of N bytes and stored in the data packet buffer unit 73. If the transfer rate of the leased network 4 is detected as 256 kbps, data from the data block buffer 72 is divided into data packets each having a fixed length of 4×N bytes and stored in the data packet buffer unit 73. Likewise, if a transfer rate of 768 kbps is detected, data from the data block buffer 72 is divided into data packets each having a data length of 12×N bytes, as indicated by the table in FIG. 15. As in the control operation described above, a value n of the data packet pointer unit in FIG. 4 is changed to this value and always compared with the packet read pointer value, thus performing control. With this operation, the delay time is kept constant. In addition, the complexity of control is reduced, and effective use of a band can be realized.

As described above, according to the embodiment of the present invention, when a request to transfer real-time data is generated while non-real-time data is transferred, the non-real-time data is transferred in units of frames each having the data length in the data packet buffer unit 73, and the real-time data frame is inserted between the non-real-time data frames. Thereafter, the remaining data packets in the data packet buffer unit 73 are continuously transferred, thereby effectively using a band.

As has been described above, according to the present invention, a band can be effectively used, and communication can be efficiently performed.

Even while non-real-time data such as LAN data is communicated, real-time data such as speech can be communicated without degrading the real-time property.

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiment, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiment are realized by executing the program codes which are read by a computer, the present invention includes a case where an OS (operating system) or the like working on the computer performs a part or entire processes in accordance with designations of the program codes and realizes functions according to the above embodiment.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiment.

In a case where the present invention is applied to the aforesaid storage medium, the storage medium stores program codes corresponding to the flowchart described in the embodiment. Briefly, the storage medium stores each module shown as an example of a memory map in FIG. 14.

As many apparently widely different embodiments of the present invention can be made without departing from the spirit and scope thereof, it is to be understood that the invention is not limited to the specific embodiments thereof except as defined in the appended claims.

What is claimed is:

1. A communication apparatus for transferring, to a communication network, a frame formed by multiplexing real-time data for which real-time transmission is required and non-real-time data for which a certain delay is allowed, upon dynamically allocating a band by using a statistical multiplexing effect, comprising:

detection means for detecting generation of the real-time data;

disassembly means for disassembling the non-real-time data into at least one fixed-length data packet;

frame generating means for generating the frame from the disassembled data packet or the real-time data;

insertion means for, when generation of the real-time data is detected by said detection means while the frame is generated by using the disassembled data packet, interrupting the generation of the frame using the disassembled data packet, and inserting generation of the frame using the real-time data; and resuming means for, after the insertion is performed by said insertion means, resuming the generation of the frame using the disassembled data packet before the insertion.

2. The apparatus according to claim 1, wherein said apparatus further comprises rate detection means for detecting a transfer rate of the communication network, and determines a fixed length of the data packet on the basis of the transfer rate.

3. A multimedia communication method of transferring, to a communication network, a frame formed by multiplexing real-time data for which real-time transmission is required and non-real-time data for which a certain delay is allowed, upon dynamically allocating a band by using a statistical multiplexing effect, comprising:

the detection step of detecting generation of the real-time data;

the disassembly step of disassembling the non-real-time data into at least one fixed-length data packet;

the frame generating step of generating the frame from the disassembled data packet or the real-time data;

the insertion step of, when generation of the real-time data is detected in the detection step while the frame is generated by using the disassembled data packet, interrupting the generation of the frame using the disassembled data packet, and inserting generation of the frame using the real-time data; and the resuming step of, after the insertion is performed in the insertion step, resuming the generation of the frame using the disassembled data packet before the insertion.

4. The method according to claim 3, wherein said method further comprises the rate detection step of detecting a transfer rate of the communication network, and determines a fixed length of the data packet on the basis of the transfer rate.

* * * * *

UNITED STATES PATENT AND TRADEMARK OFFICE
CERTIFICATE OF CORRECTION

PATENT NO.      : 6,466,546 B1
DATED           : October 15, 2002
INVENTOR(S)     : Takahiro Tsukamoto It is certified that error appears in the above-identified patent and that said Letters Patent is hereby corrected as shown below:

<u>Column 9,</u>
Line 31, "packet –buffer" should read -- packet buffer --
Line 35, "line rated" should read -- line rate --

Signed and Sealed this

Eighteenth Day of March, 2003

JAMES E. ROGAN
*Director of the United States Patent and Trademark Office*